May 22, 1962    P. A. HOOGESTEGER    3,035,364
PHOTOGRAPHIC TRANSPARENCY MOUNT ADAPTER
Filed May 16, 1960
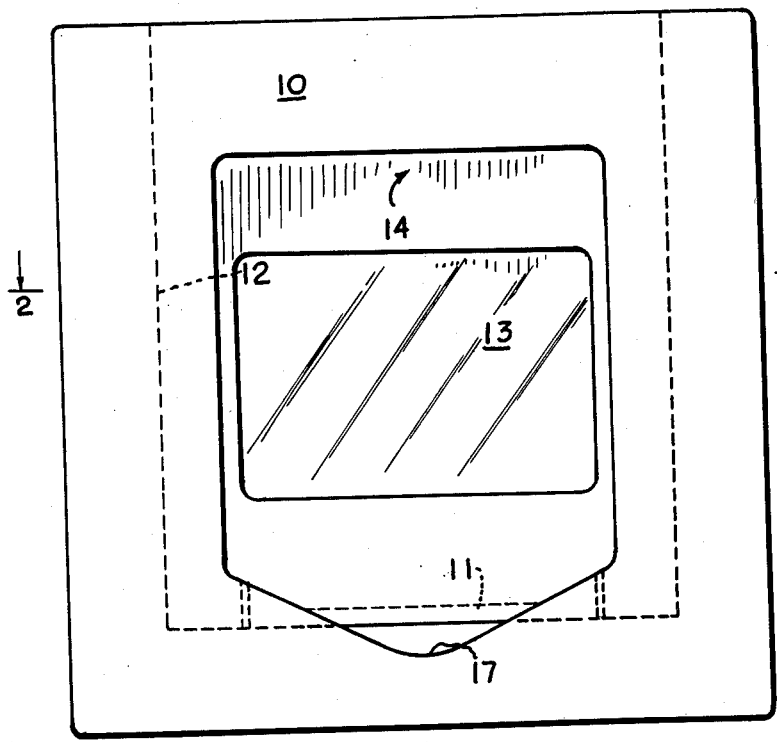
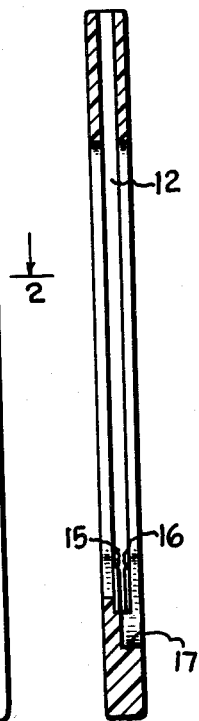
INVENTOR.
PAUL A. HOOGESTEGER
ATTORNEY

United States Patent Office 3,035,364
Patented May 22, 1962

3,035,364
PHOTOGRAPHIC TRANSPARENCY
MOUNT ADAPTER
Paul A. Hoogesteger, Brighton, N.Y., assignor to Bausch & Lomb Incorporated, a corporation of New York
Filed May 16, 1960, Ser. No. 29,524
1 Claim. (Cl. 40—152)

The present invention relates to photographic transparency mounts and is more particularly concerned with an adapter for receiving such mounts of a relatively small dimension, which adapter is designed for use with a relatively larger slide projector so that the small transparencies may be projected by the larger size projector.

It has come to be quite conventional to mount slide transparencies in paper or plastic frames having outside dimensions of approximately 2" x 2". It has also become desirable to provide projectors capable of handling larger sized transparency mounts as this enables somewhat greater clarity of the image being projected. An undesirable feature of these two trends is that the smaller size transparencies are not readily handled by the projectors which ordinarily utilize the large size transparency mounts. Accordingly, the principal object of the present invention is to provide an adapter for mounting the small size transparency mounts in a frame which may be handled by a projector capable of handling the larger size mounts.

A more particular object of the present invention is to provide such an adapter which is readily adapted for receiving the small size mounts and yet is provided with means for facilitating removal of the small size mounts from the adapters.

The foregoing and other objects and advantages of the present invention will become more readily apparent from the following detailed description when read in conjunction with the accompanying drawing wherein:

FIG. 1 represents a plan view of a transparency mount adapter constructed in accordance with the principles of the present invention;

FIG. 2 represents a sectional view taken substantially along the line 2—2 in FIG. 1 and looking in the direction of the arrows; and FIG. 3 is a sectional view taken substantially along the line 3—3 in FIG. 1 and looking in the direction of the arrows.

With reference now to the drawing, wherein like reference numerals have been used in the different views to identify identical parts, the transparency mount adapter comprising the subject matter of the present invention includes a front frame portion 10, a back frame portion 11 and a spacer portion 12. Each of the front and back frame portions 10 and 11 and spacer portion 12 are integral with each other, with the front and back frame portions 10 and 11 each being formed with a central opening 13 within which the picture portion of the slide transparency is to be disposed. The spacer portion 12 is generally U-shaped in cross-section, being open at the top for facilitating insertion of a transparency mount 14 therein. Each of the front and back frame portions 10 and 11 is formed with opposed lugs 15 and 16 which cooperate with the leading edge of the transparency mount after it is fully inserted into the pocket defined by the front and back frame portions and spacer portion 10, 11 and 12 for retaining the transparency mount 14 within the pocket.

By providing the lugs 15 and 16 at the bottom of the pocket when the transparency mount is received, there is no obstruction to the admission of the transparency mount 14 into the pocket until just prior to the point of its final positioning therein and thereafter the lugs 15 and 16 are effective to hold the transparency mount quite rigidly within the pocket.

It is frequently desired to remove a transparency mount 14 from the adapter and to this end, the front frame portion 10 is cut away, as indicated at 17, this cut away portion 17 extending below the inside edge of the spacer portion 12 and thereby enabling anyone to engage the lower edge of the transparency mount either with an instrument or with one's fingernail in order to force the transparency mount out of the adapter pocket.

This feature of the cut away portion 17 in the front frame portion 10 for facilitating removal of the transparency mount from the adapter pocket has been found to be particularly desirable as it thus enables the removal of the transparency mount from within the adapter without damage to the film portion of the transparency.

It is contemplated that numerous changes and modifications may be made in the present invention without departing from the spirit or scope thereof.

What is clamed is:

A photographic transparency mount adapter for adapting a relatively small transparency mount for projection by a slide projector designed for receiving relatively larger transparency mounts, said adapter comprising integrally joined front frame, spacer and back frame portions, said front and back frame portions being open in the central areas thereof and said spacer portion being generally U-shaped having side walls and an end wall, the outer edge of said side walls being aligned with the outer edges of said front and back frame portions and the end wall being spaced outwardly from the inner edges of the open central areas of said front and back frame portions to provide a pocket between said front and back frame portions which is closed at the bottom and side edges thereof and open at the top edge thereof, each of said front and back frame portions being formed with opposed inwardly directed lug means at the bottom of said pocket for frictionally engaging the edge of said transparency mount to prevent the transparency mount from accidentally falling out of said adapter, and one of said front and back frame portions being cut away at the bottom of said pocket to allow for biasing the transparency mount upwardly from said pocket by engagement of the bottom edge of the mount through the cutaway at the bottom of said pocket, the cutaway being in the center of the base portion and extending below the inside edge of the spacer portion.

References Cited in the file of this patent
UNITED STATES PATENTS

| | | |
|---|---|---|
| 1,867,323 | Meyer | July 12, 1932 |
| 2,390,053 | Bradford | Dec. 4, 1945 |
| 2,532,776 | Linser | Dec. 5, 1950 |
| 2,803,077 | Baireuther | Aug. 20, 1957 |
| 2,816,381 | Jablon | Dec. 17, 1957 |
| 2,931,118 | Reidel | Apr. 5, 1960 |

FOREIGN PATENTS

| | | |
|---|---|---|
| 722,829 | Germany | July 22, 1942 |
| 1,162,510 | France | Apr. 8, 1958 |